US009094206B2

(12) United States Patent
Di Crescenzo et al.

(10) Patent No.: US 9,094,206 B2
(45) Date of Patent: Jul. 28, 2015

(54) METHOD AND SYSTEM FOR SECURE SESSION ESTABLISHMENT USING IDENTITY-BASED ENCRYPTION (VDTLS)

(75) Inventors: Giovanni Di Crescenzo, Madison, NJ (US); Stanley Pietrowicz, Freehold, NJ (US); Hyong Sop Shim, Basking Ridge, NJ (US); Tao Zhang, Fort Lee, NJ (US)

(73) Assignee: Telcordia Technologies, Inc., Piscataway, NJ (US)

( * ) Notice: Subject to any disclaimer, the term of this patent is extended or adjusted under 35 U.S.C. 154(b) by 1250 days.

(21) Appl. No.: 12/259,054

(22) Filed: Oct. 27, 2008

(65) Prior Publication Data

US 2010/0031042 A1 Feb. 4, 2010

Related U.S. Application Data

(60) Provisional application No. 61/000,457, filed on Oct. 26, 2007, provisional application No. 61/066,630, filed on Feb. 21, 2008.

(51) Int. Cl.
*G06F 15/16* (2006.01)
*H04L 9/32* (2006.01)
*H04L 29/06* (2006.01)
*H04L 9/30* (2006.01)

(52) U.S. Cl.
CPC .............. *H04L 9/32* (2013.01); *H04L 9/3073* (2013.01); *H04L 9/3263* (2013.01); *H04L 9/3273* (2013.01); *H04L 63/06* (2013.01); *H04L 2209/84* (2013.01)

(58) Field of Classification Search
CPC ................................. H04L 63/06; H04L 9/32
See application file for complete search history.

(56) References Cited

U.S. PATENT DOCUMENTS

| 6,119,167 | A  | * | 9/2000 | Boyle et al. | 709/234 |
|---|---|---|---|---|---|
| 8,245,050 | B1 | * | 8/2012 | Subramanian et al. | 713/183 |
| 2002/0004900 | A1 | * | 1/2002 | Patel | 713/155 |
| 2003/0200437 | A1 | * | 10/2003 | Oishi | 713/175 |
| 2004/0179684 | A1 | * | 9/2004 | Appenzeller et al. | 380/44 |
| 2005/0044381 | A1 | * | 2/2005 | Larsen et al. | 713/182 |
| 2005/0136892 | A1 | * | 6/2005 | Oesterling et al. | 455/411 |
| 2005/0246778 | A1 | * | 11/2005 | Usov et al. | 726/28 |
| 2007/0222555 | A1 | * | 9/2007 | Tengler et al. | 340/5.6 |
| 2007/0223702 | A1 | * | 9/2007 | Tengler et al. | 380/270 |
| 2007/0282796 | A1 | * | 12/2007 | Evenhaim | 707/3 |
| 2008/0130895 | A1 | * | 6/2008 | Jueneman et al. | 380/277 |
| 2009/0063847 | A1 | * | 3/2009 | Haynes et al. | 713/150 |

OTHER PUBLICATIONS

Pietrowicz et al.; VDTLS—Providing Secure Communications in Vehicle Networks; 2008; IEEE; 6 Pages.*
Appendix H: WAVE/DSRC Security.

(Continued)

*Primary Examiner* — Arvin Eskandarnia
*Assistant Examiner* — Anthony Fabbri

(57) ABSTRACT

The inventive system for providing strong security for UDP communications in networks comprises a server, a client, and a secure communication protocol wherein authentication of client and server, either unilaterally or mutually, is performed using identity based encryption, the secure communication protocol preserves privacy of the client, achieves significant bandwidth savings, and eliminates overheads associated with certificate management. VDTLS also enables session mobility across multiple IP domains through its session resumption capability.

3 Claims, 5 Drawing Sheets

(56) References Cited

OTHER PUBLICATIONS

Vehicle Safety Communications Project Final Report, US Department of Transportation, National Highway Safety Traffic Administration, Apr. 2006.

Boneh D., Franklin M., Identity-Based Encryption from the Weil Pairing. Advances in Cryptology—Proceedings of CRYPTO 2001, Lecture Notes in Computer Science, Springer-Verlag.

National Highway Traffic Safety Administration (NHTSA), Vehicle Safety Communications Project Task 3 Final Report—Identify Intelligent Vehicle Safety Applications Enabled by DSRC, Mar. 2005.

Rescorla E., Whyte W., and Kavner D., Analysis of Combinatoric Certificate Schemes, Aug. 7, 2006.

Rescorla E., Whyte W., and Kavner D., Anonymous OBU Security Schemes for Vehicle Safety Applications, Oct. 30, 2005.

Jones, William S., US Department of Transportation, A VII Deployment Scenario, Dec. 22, 2005.

Shamir A., Identity-Based Cryptosystems and Signature Schemes. Advances in Cryptology: Proceedings of CRYPTO 84, Lecture Notes in Computer Science, 7:47-53, 1984, Springer-Verlag.

Cocks C., An Identity Based Encryption Scheme Based on Quadratic Residues, Proceedings of the 8th IMA International Conference on Cryptography and Coding, 2001.

Fujisaki E., Okamoto T., Secure Integration of Asymmetric and Symmetric Encryption Schemes, Advances in Cryptology: Proceedings of CRYPTO 99, Lecture Notes in Computer Science, vol. 1666, Springer-Verlag.

IEEE P1609.2, Trial-Use Standard for Wireless Access in Vehicular Environments—Security Services for Applications and Management Messages, Apr. 2006.

The Transport Layer Security (TLS) Protocol, Version 1.1, TLS (RFC4346), Apr. 2006.

Datagram Transport Layer Security (RFC4347), Apr. 2006.

International Search Report dated Jan. 12, 2009.

\* cited by examiner

**FINISHED SENT ALONG WITH ANY PENDING DATA TO BE TRANSMITTED

**FINISHED SENT ALONG WITH ANY PENDING APPLICATION DATA TO BE TRANSMITTED

**FINISHED SENT ALONG WITH ANY PENDING APPLICATION DATA TO BE TRANSMITTED

METHOD AND SYSTEM FOR SECURE SESSION ESTABLISHMENT USING IDENTITY-BASED ENCRYPTION (VDTLS)

CROSS REFERENCE TO RELATED APPLICATION

The present invention claims the benefit of U.S. provisional patent application 61/000,457 filed Oct. 26, 2007, and of U.S. provisional patent application 61/066,630 filed Feb. 21, 2008, the entire contents and disclosure of both are incorporated herein by reference.

FIELD OF THE INVENTION

The present invention relates generally to transport layer security for IP communications, and more specifically to establishing Datagram Transport Layer Security using identity-based encryption.

BACKGROUND OF THE INVENTION

The difficult challenges of providing secure communications over the Internet are exacerbated in vehicle networks, such as the Vehicle Integration Infrastructure (VII). VII is a US Department of Transportation (DOT) intelligent highways initiative (National Highway Traffic Safety Administration (NHTSA), Vehicle Safety Communications Project Task 3 Final Report-Identify Intelligent Vehicle Safety Applications Enabled by DSRC, March 2005) that is a vehicle network aimed at improving highway safety and reducing congestion through the use of vehicles that can communicate with an intelligent infrastructure and vehicles that can communicate with each other.

There are two basic types of communications in VII: Vehicle-to-Infrastructure (V2I) and Vehicle-to-Vehicle (V2V). V2I communication is used for vehicles to communicate with roadside equipment (RSE) and back-end servers, while V2V communication is used for vehicles to directly commicate with each other. In Boneb D., Franklin M., *Identity-Based Encryption from the Weil Pairing*, Advances in Cryptology—Proceedings of CRYPTO 2001, Lecture Notes in Computer Science, Springer-Verlag, the authors describe V2I applications spanning safety, mobility, and infotainments services. Boneh and Franklin also describe V2V applications that are presently dominated by cooperative safety applications, such as emergency electronic brake lights, lane change warning, and cooperative forward collision warning. However, additional V2V consumer applications are likely to evolve.

Most V2I applications, such as probe data collection and toll payment, require secure communications to protect privacy and prevent eavesdropping, message forgery, masquerading, and other kinds of attacks. These applications typically do not need long communication sessions and therefore prefer to use a lightweight transport protocol, such as User Datagram Protocol (UDP), for data transport. In addition, V2I applications typically do not require a secure session to span multiple RSE zones. Instead, the secure sessions of V2I applications need only persist within a single zone. In a typical application, a vehicle entering an RSE zone requests and establishes a secure UDP session with an application running on the RSE or on a back-end server The vehicle conducts its communication and then disconnects prior to leaving the zone.

FIG. 1 shows a typical vehicle infrastructure 10, e.g. VII, as known in the art. The primary components of the VII as illustrated in FIG. 1 are On-Board Equipment (OBE) (not shown) located in each vehicle 12, a network infrastructure with access points called Roadside Equipment (RSE) 14; and a multitude of Applications 16, typically with a client that executes on the OBE and servers 18 associated with back-end applications located in the network infrastructure 10.

As shown in FIG. 1, wireless links among vehicles 12 and between vehicles 12 and RSEs 14 is inherently insecure because all parties within range of the radio signal can acquire it. Any communications sent across the air in clear text can be eavesdropped. Messages may be manipulated if not integrity-protected. Further, if not authenticated, any communicating party may be impersonated. Therefore, secure UDP sessions are needed between client applications running on the OBE and server applications 18 running on the RSE 14 or in the back-end VII infrastructure 10. Security mechanisms for such systems need to take into account a large number of mobile nodes, limited over-the-air bandwidth, and unreliable, intermittent network connectivity. In addition, the privacy of vehicles 12 and their operators needs to be preserved while still being able to authenticate them and remove intruders.

The Internet Engineering Task Force (IETE) Datagram Transport Layer Security (DTLS) secure session protocol is the UDP version of the popular Secure Sockets Layer (SSL)/Transport Layer Security (TLS), which is described in Fujisaki E., Okamoto T., *Secure Integration of Asymmetric and Symmetric Encryption Schemes*, Advances in Cryptology; Proceedings of CRYPTO 99, Lecture Notes in Computer Science, vol. 1666, Springer-Verla. DTLS mimics the TLS capabilities over UDP transport, providing a reliable handshake method for establishing secure sessions over best-effort datagram transport. Therefore, DTLS provides the basis for providing strong security to the UDP communications of on-vehicle applications in the VII network.

A secure session in DTLS is negotiated by an application client and an application server using the DTLS handshake procedure. The DTLS handshake procedure consists of three (3) rounds of message exchange. DTLS sessions are always initiated by a client by sending a ClientHello message to the server. The server verifies the message using HelloVerifyRequest. The first round of messaging is primarily used to thwart denial of service and amplification attacks. The second round of messaging is used for authentication and key exchange. In this round, the server sends a group of messages including ServerHelloCertificate, ServerKeyExchange, CertificateRequest, and ServerHelloDone. At the end of the second round of handshake messaging, the server awaits a client response. The third round of messaging begins with the client sending its certificate in the Certificate message. The ClientKeyExchange message represents the final message that will be used by both client and server to compute a premaster secret. When all rounds have successfully transpired, the handshake is complete, making the session official, and data can be exchanged using the DTLS record protocol. Throughout the handshake exchange, any mis-ordering of messages, failures, or unexpected responses are handled by error and closure alerts.

However, DTLS lacks security requirements necessary in certain infrastructures, such as a vehicle infrastructure, e.g. VII. First, DTLS relies on digital certificates for entity authentication. Therefore, by definition, the identities of DTLS users are always known, and privacy cannot be preserved. Furthermore, when establishing a new session in DTLS, the communicating parties exchange arbitrarily long chains of certificates in order to successfully authenticate each other. Given that the size of a certificate can be large, e.g., typically a few thousand bytes for a certificate with a 1024-bit key pair, the over-the-air bandwidth requirement for exchange of certificate chains can be prohibitively large, especially in a radio zone with heavy traffic. In addition, use of digital certificates requires the ability to revoke certificates by way of certificate revocation lists (CRLs). Over-the-air distribution and/or update of CRLs would require a significant amount of network bandwidth in a Dedicated Short Range Communications (DSRC) zone.

Therefore, transport layer security as currently known in the art lacks certain features to secure UDP communications in the VII and similar infrastructures. First, such known security provides no support for privacy-preserving measures or 1609.2 vehicle certificates. Second, such known security requires multiple rounds of handshake messaging to establish a secure session. Some handshake messages, such as the ones used to exchange certificates, can be very long. In an unreliable wireless environment with relatively small RSE zones and vehicles traveling at highway speeds, the time needed to complete the handshake detracts from the limited available time to complete the transaction while the vehicle is still within the zone. Third, such known security requires the direct transmission of certificates during the handshake procedure for authentication. Certificates can be quite large and would unnecessarily consume limited air link bandwidth on the service channels.

The following abbreviations are used throughout:
AES Advanced Encryption Standard
CA Certificate Authority
CBC Cipher Block Chaining
CRL Certificate Revocation List
DSRC Dedicated Short Range Communications
DTLS Datagram Transport Layer Security
HMAC Keyed-Hash Message Authentication Code
IBE Identity-Based Encryption
IETF Internet Engineering Task Force
MAC Message Authentication Code
OBE On-Board Equipment
PKI Public Key Infrastructure
POC Proof of Concept
PST Provider Service Table
RSE Roadside Equipment
SSL Secure Socket Layer
SSS System Subsystem Specification
TLS Transport Layer Security
UDP User Datagram Protocol
V2I Vehicle-to-Infrastructure
V2V Vehicle-to-Vehicle
VDTLS Vehicle Datagram Transport Layer Security Protocol
VII Vehicle Infrastructure Integration
WAVE Wireless Access in Vehicular Environments
WSA WAVE Service Advertisement
WSMP WAVE Short Message Protocol

SUMMARY OF THE INVENTION

The present invention provides an inventive solution to the above problems by using IBE as the underlying key exchange and authentication mechanism in the handshake protocol of an infrastructure. Furthermore, the inventive solution can use 1609.2 anonymous certificates as means of providing privacy in secure sessions. Hence, the inventive solution referred to as Vehicular Datagram Transport Layer Security (VDTLS) advantageously provides secure communications in vehicle networks, e.g., VII. VDTLS is an application-layer secure session protocol designed to provide secure UDP communications. As its name implies, VDTLS is derived from the IETF DTLS protocol with modifications to, and only to, the session handshake protocol using a new authentication and key exchange method based on IBE. In particular, VDTLS uses an abbreviated reliable message exchange to create a secure session, as opposed to the three rounds of message exchanges in DTLS, as described above. In addition, VDTLS uses IBE, instead of certificates, to perform authenticated key exchange for bi-directional secure sessions and for direct data encryption to support secure, unidirectional, session-less data transfers. VDTLS supports both secure session-oriented and secure session-less communications.

The inventive system for providing strong security for UDP communications in networks comprises a server, a client, and a secure communication protocol wherein authentication of client and server, either unilaterally or mutually, is performed using identity based encryption, the secure communication protocol preserves privacy of the client, achieves significant bandwidth savings, and eliminates overheads associated with certificate management. VDTLS also enables session mobility across multiple IP domains through its session resumption capability.

BRIEF DESCRIPTION OF THE DRAWINGS

The invention is further described in the detailed description that follows, by reference to the noted drawings by way of non-limiting illustrative embodiments of the invention, in which like reference numerals represent similar parts throughout the drawings. As should be understood, however, the invention is not limited to the precise arrangements and instrumentalities shown. In the drawings.

DETAILED DESCRIPTION OF THE INVENTION

Figure 1:
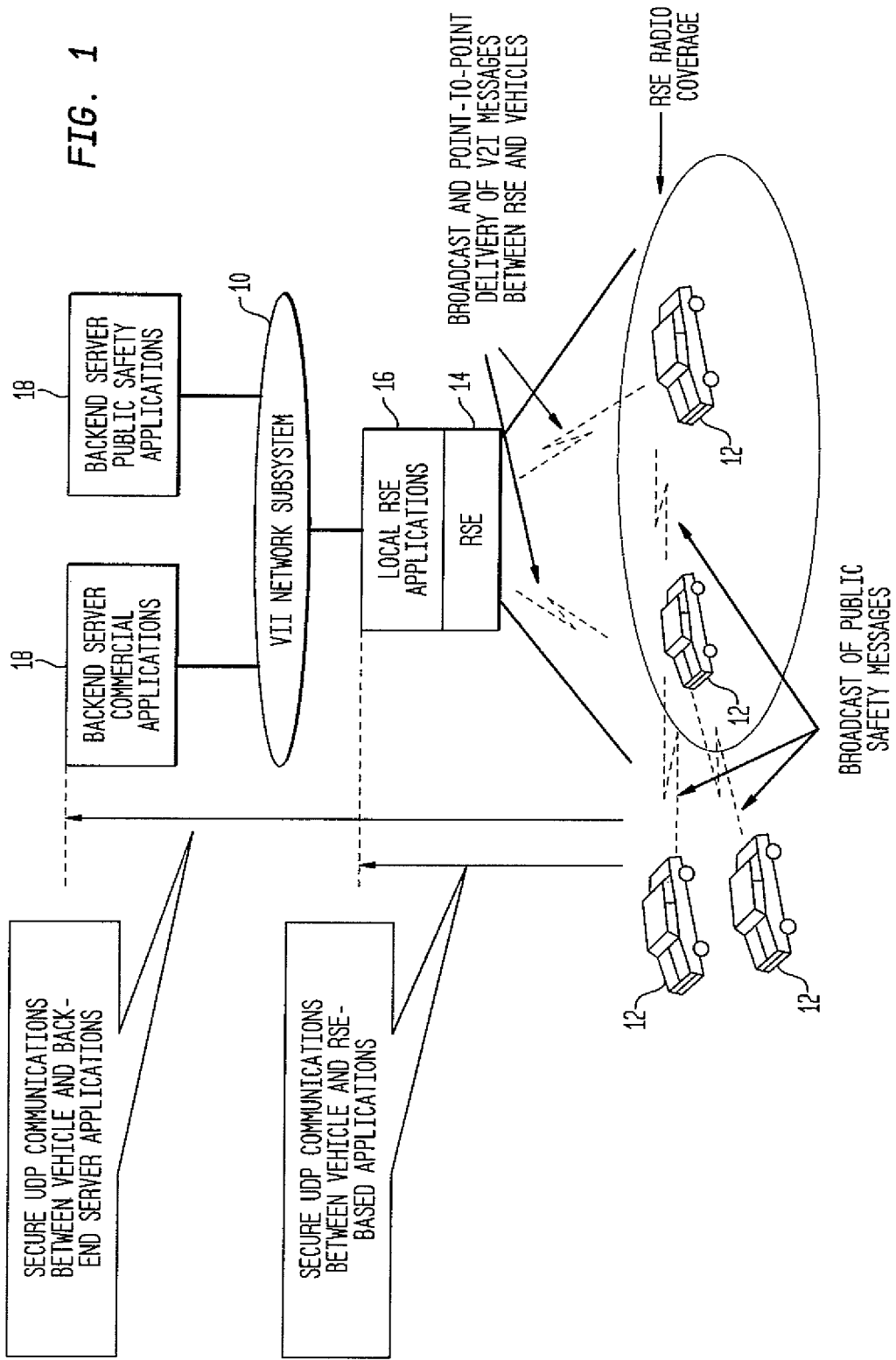
FIG. 1 illustrates a typical vehicle infrastructure.

An inventive solution to the need for a protocol enabling vehicle communication over a network is presented. To protect data communications against attack, vehicular applications typically require message authentication, integrity, encryption, and other cryptographic services. In the VII, vehicles travel rapidly across short-range, disjoint DSRC radio zones of the RSEs. Network connectivity is intermittent and short in duration. The key requirements or protocol objectives for secure UDP communications in the VII system are as follows.

A first objective is Secure End-to-End Sessions; the protocol should enable the establishment of secure, end-to-end, application-level UDP sessions. Each application should be able to select its own security parameters and establish and manage its own secure sessions. Secure UDP sessions involve three key elements: Mutual Authentication, that is, the authentication of both client and server, Data Encryption, that is, bulk data encryption and the secure negotiation of encryption parameters, and Message Integrity Protection, that is, bulk message integrity protection and the secure negotiation of message integrity parameters. A common practice in providing security on the "wired" Internet is to authenticate only the server automatically, e.g. by way of trusted certificates, while client authentication is performed "manually" by end users entering their credentials. This approach does not work for on-vehicle applications as end users are typically operating the vehicle and hence unable to enter information such as credentials. Saving and reusing end user credentials, for example by using cookies, places the privacy of the users at risk. Therefore, an efficient mechanism should be provided that allows seamless mutual authentication, that is, authentication of both the server and client, when establishing secure sessions. In addition, strong authentication using asymmetric cryptography is preferred.

A second objective is Fast Session Establishment; the process to establish a secure session should be quick and nimble. Secure sessions need to be established quickly because, at highway speeds, vehicles may spend only a few seconds inside each RSE zone. A secure session needs to be established and application data communicated before a vehicle leaves an RSE zone.

A third objective is Bi-directional Communication to allow the client and server to exchange data during a session. Uni-directional Communication, that is, secure uni-directional, session-less communication can also be supported.

A fourth objective is Processing Efficiency. The protocol can support symmetric encryption for bulk data transfer. Symmetric encryption is more computationally efficient than asymmetric encryption.

A fifth objective is Bandwidth Efficiency. Security mechanisms should minimize over-the-air bandwidth requirements, such as the number of messages and the total number of bytes of all the messages exchanged to support security because the available bandwidth in an RSE zone is shared among all vehicles in the zone. The protocol can minimize the number of handshake messages and the amount of data that needs to be exchanged over the wireless link to set up a secure session. It could, for instance, minimize the amount of information that needs to be broadcast.

A sixth objective is Self-Containment or Protocol Modularity. No or only minimal new requirements can be imposed on lower layer and peer protocols, e.g., Wireless Access in Vehicular Environments (WAVE) Short Message Protocol (WSMP). Similarly, the protocol cannot be intrinsically bound to the WSMP.

A seventh objective is to Leverage Existing Protocol Standards for secure communication, such as the IETF DTLS protocol (RFC4347) and TLS (RFC4346) to facilitate better Industry adoption An eighth objective is Privacy-Preserving, that is, preserving vehicle privacy. Most public safety and mobility applications in vehicle networks require the exchange of data among vehicles and between vehicles and the network infrastructure. Participating in these applications should not risk exposing the identities of the vehicle or its operator. A mechanism is required that allows mutual authentication of communicating parties while preserving their privacy.

As discussed above, DTLS does not satisfy the security requirements or objectives listed above. To overcome the deficiencies of DTLS, the present invention employs a relatively recent development in public key cryptography called Identity Based Encryption (IBE). IBE is a novel type of public-key encryption with the special property of allowing any arbitrary string, e.g., an email address or an IP address, to be used as the recipient's public key. The concept of IBE was first proposed by Adi Shamir, in *Identity-Based Cryptosystems and Signature Schemes*, Advances in Cryptology: Proceedings of CRYPTO 84, Lecture Notes in Computer Science, 7:47-53, 1984, Springer-Verlag, as a way to simplify certificate verification and management in PKI. More recently, IBE has been implemented within commercial products, providing, among other services, encrypted e-mail.

More formally, an identity-based public-key cryptosystem can be defined as a 4-tuple of probabilistic algorithms (Setup, Extract, Encrypt, Decrypt), with the following semantics and syntax:

SETUP is used by the IBE key server to generate master public parameters mpk and a master secret key msk; on input of a security parameter n, it returns pair (mpk,msk).

EXTRACT is used by the IBE key server to generate a secret key sk_id in correspondence to a party's identity id, i.e. the application server's identity; on input of an identity id and the values mpk, msk, it returns value sk_id.

ENCRYPT is used by a sender, i.e. the client, who wants to encrypt a message to a receiving party, i.e. the application server, and only uses the receiver's identity and the master public parameters mpk; on input of mpk, id, and message m, it returns a ciphertext c.

DECRYPT is used by a receiver, i.e. the application server, to decrypt a ciphertext and only uses the secret key sk_id and the master public parameters mpk; on input of mpk, id, and ciphertext c, it returns a message m, or a special failure symbol indicating that the ciphertext was not properly computed.

These algorithms are required to satisfy a standard consistency constraint, namely when sk_id is the secret key generated by algorithm EXTRACT in response to receiving id as the public key, then it holds that Decrypt(mpk;c; sk_id)=m where c=Encrypt(mpk;id;m).

Moreover, the algorithms are required to satisfy a notion of message privacy or confidentiality called "security against chosen-ciphertext attacks", or "chosen ciphertext security", which is known in the art as a standard acceptable notion of security for a public key encryption scheme that is conventional and not identity-based. Informally, a public-key encryption scheme is secure against chosen-ciphertext attacks if an encryption of one out of two messages chosen by the adversary still does not help in guessing which message has been encrypted, even if the adversary is allowed to see decryptions for arbitrarily chosen ciphertexts before and after returning the two messages. In fact, the security notion that an identity-based public-key cryptosystem is required to satisfy is somewhat stronger than a conventional public-key scheme. This is because an adversary attacking a particular public key id in such an identity-based system might have somehow obtained the secret keys of users id(1), . . . , id(n) of the adversary's choice. Thus, identity-based public-key cryptosystems are required to satisfy this stronger notion of confidentiality or message privacy, that is, "security against chosen-ciphertext and chosen-identity attacks".

Accordingly, DTLS can be modified into VDTLS based on any identity-based encryption scheme with this stronger privacy or confidentiality security property. For example, the scheme by Boneh and Franklin (see above) satisfies this security notion, under certain intractability assumptions, which is considered to be acceptable in practical applications by the cryptographic community.

As discussed above, IBE can be used in the VDTLS secure session protocol to perform premaster key exchange and client authentication. In adapting DTLS for use in the vehicular network, IBE {public identity, private key} pairs can be used in place of traditional certificates to generate symmetric keys for secure sessions. IBE provides the following advantages in providing security for applications in vehicular networks.

A first advantage is that the communicating parties that use IBE can be preconfigured with public identities of each other or these public identities can easily be acquired "out-ofband", as discussed further below. This means that the exchange of certificate chains in DTLS can be completely avoided, saving a significant amount of valuable over-the-air bandwidth.

A second advantage is that in IBE, public identities are not revoked. Instead, they can be associated with expiry time. Specifically, when a public identity expires, its owner can make a request to an IBE key server to receive a new private key. In addition, when securing data with public identities, date and time criteria can be added to guard against the attacks that use old identities. Therefore, there is no need for creation, update, and distribution of certificate revocation lists (CRLs) to millions of vehicles. The related savings in both over-the-air bandwidth and CPU loads are significant given that CRLs can grow to an arbitrarily large size and that no CPU cycles are needed to check for revoked certificates.

IBE makes it easier to enable privacy in vehicular communications. For example, in the VII, vehicle anonymity can be achieved with a certificate scheme where each vehicle is assigned n certificates that are randomly selected from a system wide pool of N shared certificates, called anonymous certificates. Parameters n and N are typically in the range of 5 to 20, and 10,000 to 30,000, respectively. These certificates are currently designed based on the IEEE 1609.2 certificate formats and are issued by a 1609.2 certificate authority. Such a certificate scheme is taught by Tengler S., Andrews S., and Heft, R. in U.S. Patent Application Publication Nos. 2007/0223702 and 2007/0222555.

Because of the ability to turn any arbitrary strings into {public identity, private key} pairs, IBE allows the anonymous certificates of a given vehicle to be used as on-vehicle applications' public identities. This way, on-vehicle applications can achieve the same level of anonymity in their communications with their counterparts in the VII network infrastructure as that of the vehicle. By contrast, directly porting anonymous certificates to DTLS not only requires a significant amount of design, implementation, and testing efforts but also results in a solution without the aforementioned benefits of reduced over-the-air bandwidth and CPU processing requirements.

A basic version of the Boneh and Franklin identity-based public-key cryptosystem is presented. This version satisfies a weaker privacy notion, and is transformed into the version employed in an exemplary embodiment of the invention using a transformation based on cryptographic hash functions and in accordance with Fujisaki E., Okamoto T., *Secure Integration of Asymmetric and Symmetric Encryption Schemes*, Advances in Cryptology: Proceedings of CRYPTO 99, Lecture Notes in Computer Science, vol. 1666, Springer-Verlag. In this exemplary version, the algorithms are as follows:

BF-SETUP, on input of a security parameter n, does the following: it generates two groups G1, G2 and a bilinear map $e:G1 \times G1 \rightarrow G2$, it chooses an arbitrary generator P of G1, a random s in $Z^*(q)$, where q is the order of G1,G2, and it computes s*P; then, it chooses cryptographic hash functions $H1:\{0,1\}^* \rightarrow G1^*$ and $H2:0\ G2 \rightarrow \{0,1\}^*$; finally it returns the master public key mpk=(G1,G2,e,P,s*P,H1,H2) and the master secret key msk=s.

BF-EXTRACT, on input of an identity id, and the values mpk, msk, computes Q=H1(id) and sk_id=s*Q, and returns sk_id.

BF-ENCRYPT, on input of mpk, id, and message m, does the following: it computes Q=H1(id), generates a random value r in $Z^*(q)$, computes k=H2(e(r*Q,s*P)) and returns ciphertext c=(r*P,E(k;m)), where E is a symmetric encryption algorithm using key k to encrypt message m.

BF-DECRYPT, on input of mpk, id, and ciphertext c=(U, V)=(r*P,E(k;m)), does the following: it computes k=H2(e(s*Q,U)) and returns m=D(k;V), where D is the symmetric decryption algorithm corresponding to E and using key k to decrypt ciphertext V.

VDTLS Design

VDTLS is a novel and inventive application-layer secure session protocol designed to secure UDP communications in vehicle and similar network infrastructures, e.g. VII. VDTLS uses the arbitrary string feature of IBE and leverages information already known to the vehicle onboard applications as public identities of application servers in the network infrastructure. For example, in the VII system that uses the DSRC radio network, the RSE securely broadcasts information including the IP address and port number of each service that is available in its radio zone. VDTLS allows the on-vehicle client application of such a service to use this information as the IBE public key of its counterpart, i.e. the server application of the same service in the VII. This way, each client application can easily learn the public identity of its partner server application even if the address information of the server application changes as the vehicle travels from one RSE radio zone to another. This is critical as the application architecture of most public safety and mobility services in VII has a proxy of the server application running directly on the RSE for fast data collection from vehicles and, in some cases, to further anonymize collected information. Requiring all the proxies of the application server to share the same IBE public identity would significantly compromise the security of the service as a successful attack on a single RSE would expose the proxies on different RSEs to attacks. Each service requires the flexibility to select its own security parameters for encryption and integrity protection.

Authentication of the on-vehicle application while preserving privacy is an important feature of VDTLS. As discussed above, the 1609.2 anonymous certificates of a given vehicle can also function as the IBE public keys of the on-vehicle application. In one embodiment, the certificate serial number or a hash of the certificate is used to minimize message size.

The provisioning of the corresponding IBE private keys and other system parameters could be performed by the 1609.2 certificate authority during anonymous certificate creation and re-keying operations. The IBE public identity of a service (based on its address information) and IBE public identities of the vehicle (based on its anonymous certificate) can be used by VDTLS to establish secure sessions between the on-vehicle client application and the server application in the VII as follows.

Set Up Phase

Use of IBE requires the following three setup phases or processes (algorithms) to configure the IBE parameters and secret keys: IBE Parameter Setup Phase; RSE Setup Phase; and OBE Setup Phase.

In the IBE Parameter Setup Phase, the IBE Key Server in the infrastructure, e.g., VII, generates the publicly available values and parameters needed for the IBE secret key extraction, identity-based encryption and decryption algorithms. Such values and parameters are then made public and/or sent to all OBEs and RSEs. The IBE Parameter Setup Phase occurs during the installation of the infrastructure, and may also be run at any later time to update the IBE cryptographic keys in the system. In one embodiment, e.g., the VII national system or "national", the IBE Key Server can be implemented as an integral part of the 1609.2 Certificate Authority (CA).

To fulfill the IBE Parameter Setup Phase functionality, the IBE Key Server runs a procedure, e.g., IBE-Setup. This procedure takes as input a pre-determined security parameter n (e.g., n=256 bit length) and runs the algorithm SETUP from an identity-based public-key cryptosystem, e.g., the BF-SETUP algorithm discussed above in the Boneh and Franklin scheme, to generate:

A master public key mpk, which remains publicly available or is directly sent/provisioned on all OBEs and RSEs. The key mpk can later be used by OBEs and RSEs to run identity-based public-key encryption and decryption algorithms, and A master secret key msk, which remains private and known only by the IBE Key Server. This master secret key msk will later be used by the IBE Key Server to generate secret keys associated with the identities of OBEs and RSEs.

Table 1 describes the requirements associated with the IBE Parameter Setup Phase in one embodiment.

TABLE 1

IBE Parameter Setup Phase Requirements

| Req. # | IBE Parameter Setup Phase Requirements | POC | National |
|---|---|---|---|
| VF-SU-VD01 | The IBE Key Server shall be able to run the IBE Parameter Setup Phase at the beginning of the lifetime of the VDTLS system, and, if necessary, at any further time. | No | Yes |
| VF-SU-VD02 | At any time during its lifetime, the IBE Key Server shall be able to run the IBE Setup procedure for an identity-based public-key cryptosystem (e.g., the algorithm associated with Boneh-Franklin's IBE scheme). | No | Yes |
| VF-SU-VD03 | At the beginning of the VDTLS lifetime and at any later time, the IBE Key Server shall be able to compute values and parameters for the future execution of IBE algorithms and make some of them publicly available or send some of them to all OBEs and RSEs (e.g., as specified in the IBE Setup procedure described above). | No | Yes |

In the RSE Setup Phase, each VDTLS application running on the RSE obtains from the IBE Key Server an IBE secret key corresponding to its IBE public identity. The RSE Setup Phase should be run during RSE initialization; it is also recommended that RSE Setup be run occasionally during the RSE lifetime, for key refreshing purposes.

In one embodiment, the choice for the RSE's identity can be the concatenation of any pre-determined combination of the following values:

The IP address of the RSE, which is broadcast in the Provider Service Table (PST) of the WAVE Service Advertisement (WSA) to the vehicles, The UDP Port number of the RSE server application, which is information that an AppClient should already be configured with, The application's public identity, The RSE's geographic location, and A time interval denoting the key's lifetime.

As discussed above, the IBE Key Server could be implemented as an integral part of the backend 1609.2 certificate authority (CA). The creation and the distribution of the IBE secret keys for the RSEs can be managed by the 1609.2 Certificate Managers on the RSEs and on the CA. In particular, the CA/IBE Key Server could distribute the IBE secret keys for the RSEs automatically when the CA distributes the RSE 1609.2 certificates, by including the IBE secret keys in the same messages that transmit the 1609.2 certificates to the RSE.

For the POC, the IBE system parameters and secret keys will be manually configured in the VDTLS library. When an application requires decryption of IBE-encrypted data, the VDTLS library will retrieve the secret key associated with that application. The VDTLS library will support one identity and a corresponding secret key for each application in its store. Each instance of the VDTLS library, for example on each RSE, can use a different identity and secret key for the same application. However, each application on the same RSE will only be known by a single IBE identity. The invention is not limited to this configuration; other techniques known or that become known can also be used.

Figure 2:
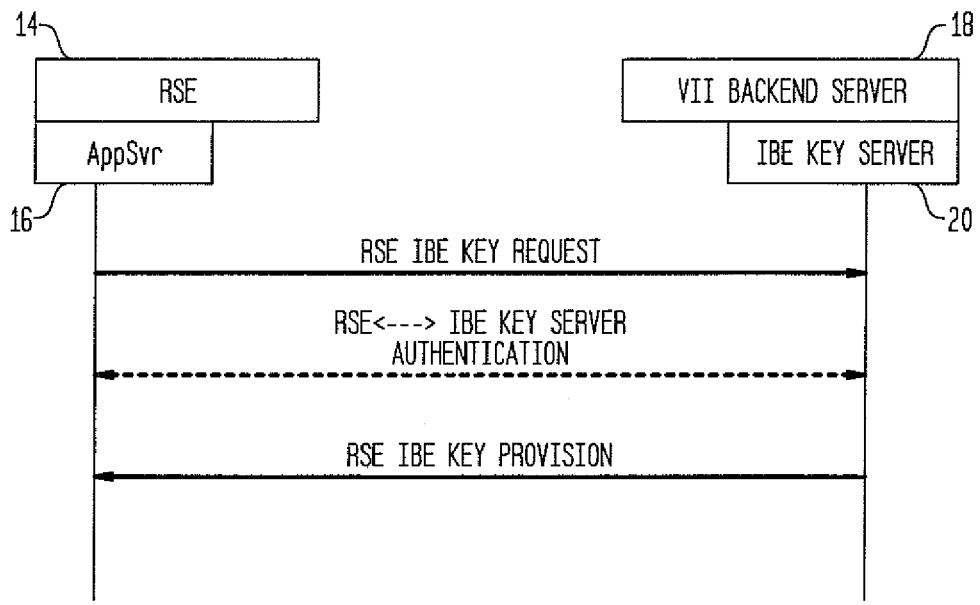
FIG. 2 illustrates a sequence of messages exchanged in RSE SetUp.

The sequence of messages exchanged in this phase is illustrated in FIG. 2 and is described in detail below. The messages exchanged between RSE 14 and IBE Key Server 20 during this phase should be transported over a reliable channel, such as TCP/IP, with an appropriate level of security. The mutual authentication of the RSE 14 and IBE Key Server 20 can be achieved by any authentication protocol used in the VII and does not need to be part of the IBE key exchange protocol.

RSE IBE Key Request. This message contains the RSE's public identity id_rse and a replay and integrity protection pair (tag,ct), where ct is the current time and tag is a value computed using a keyed hash function, such as Keyed-Hash Message Authentication Code (HMAC), using a 128-bit symmetric key k_rse_mac shared between this RSE 14 and the IBE key server 20; i.e. tag=HMAC(k_rse_mac;id_rse, cf). Upon receiving the message (id_rse', tag',ct'), the IBE key server 20 extracts from id_rse' an index associated with this RSE 14 that allows him to locate it within its list of RSEs, finds the key k_rse_mac shared with this RSE 14 and checks whether the received value ct' is sufficiently close to its current time and whether the equality tag'HMAC(k_rse_mac; id_rse',ct') holds. If either of these two checks is not satisfied, the IBE key server 20 halts the execution of this protocol. Otherwise, the execution of this protocol continues.

(RSE←→IBE Key Server) Authentication. The process of authentication between RSF 14 and IBE key server 20 can be realized in several ways, depending on the type of security association that is in effect between RSEs and the VII backend server 18. In one embodiment, this security association includes a 128-bit symmetric key k_rse_mac shared between this RSE 14 and the IBE key server 20. In this case, the symmetric key can be used for entity authentication via the following standard challenge-response protocol. The verifying party computes a random nonce R and sends it to the authenticating party, and the authenticating party replies by computing and sending the quantity t=HMAC(k_rse_mac;R) to the verifying party; the latter, upon receiving a string t', checks whether the equality t'=HMAC(k_rse_mac;R) holds.

If not, the verifying party declares the authentication protocol "unsuccessful" and halts. If yes, the verifying party declares the authentication protocol "successful" and continues with the rest of the protocol. The above procedure is executed twice to perform (RSE←→IBE Key Server) Authentication: once, with the IBE key server 20 acting as the verifying party and the RSE 14 acting as the authenticating party, and once with the two entities switching their roles. The RSE Setup phase or protocol continues if and only if both authentication procedures are declared successful.

RSE IBE Key Provision. This message contains an encryption of a secret key sk_id_rse associated with the RSE's public identity id_rse. The secret key sk_id_rse is computed by the IBE key server 20 by running algorithm EXTRACT with input of identity id_rse, and the values mpk, msk. The encryption c_sk of this secret key is computed using any symmetric encryption algorithm, such as Advanced Encryption Standard (AES) in Cipher Block Chaining (CBC) mode, and using a 128-bit symmetric key k_rse_enc shared between the IBE key server 20 and the RSE 14; i.e., c_sk=CBC-AES-encrypt(k_rse_enc; sk_id_rse). The message also contains a replay and integrity protection pair (tag,ct), where ct is the current time and tag is a value computed using a keyed hash function, such as HMAC, using the symmetric key k_rse-mac shared between this RSE 14 and the VII backend server 18; i.e. tag=HMAC(k_rse_mac;c_sk, ct). Upon receiving the message (c_sk',tag',ct'), the RSE 14 verifies the equality tag'=HMAC(k_rse_mac;c_sk', ct') and continues only if this verification is successful. Then the RSE 14 decrypts the value c_sk' by computing sk_id_rse=CBC-AES-decrypt(k_rse_enc; c_sk') and returns sk_id_rse as the secret key associated to its identity.

The requirements associated with the RSE Setup Phase according to one embodiment are described in Table 2.

TABLE 2

RSE Setup Phase Requirements

| Req. # | IBE-parameter-setup Phase Requirements | POC | National |
|---|---|---|---|
| VF-SU-VD04 | The IBE key Server and the RSE Application Server shall be able to run the RSE Setup Phase during the RSE installation procedure. | No | Yes |
| VF-SU-VD05 | The IBE Key Server and the RSE Application Server shall be able to run the RSE Setup Phase at any further time desired by either the IBE Key Server or the RSE Application Server. | No | Yes |
| VF-SU-VD06 | The IBE Key Server and the RSE Application Server shall be able to agree on a security association (e.g., 128-bit symmetric keys) and store the keys for further use during the RSE installation procedure, and at any further time desired by any one among them. | No | Yes |
| VF-SU-VD07 | At any time during their lifetime, the IBE Key Server and the RSE Application Server shall be able to run the following security and cryptographic algorithms: (1) symmetric key-generation, encryption and decryption algorithms (e.g., those associated with AES in CBC mode), (2) symmetric generation and verification algorithms for integrity protection or message authentication (e.g., those associated with AES in CBC mode), (3) a procedure for the secure reading or verification of current time. At any time during its lifetime, the IBE Key Server shall be able to run master key setup and secret key extraction algorithms for an identity-based public-key cryptosystem (e.g., those associated with Boneh-Franklin's IBE scheme). | No | Yes |
| VF-SU-VD08 | At any time during its lifetime, the RSE Application Server shall be able to efficiently generate an identity string containing any pre-determined combination of the following values: the RSE's IP address, the UDP Port number of the RSE Application Server, the application's public identity, the RSE's geographic location and a time interval denoting the key lifetime. | No | Yes |
| VF-SU-VD09 | At any time during their lifetime, the IBE Key Server, upon receiving an Identity string from the RSE Application Server, shall be able to verify that the identity string is legitimate and uniquely identifies the RSE Application Server that sent it. | No | Yes |
| VF-SU-VD10 | During the RSE-Setup Phase and at any further time, the RSE Application Server shall be able to send to the IBE Key Server a request for a secret key associated to its identity to be used to decrypt messages encrypted according to an identity-based encryption scheme (e.g., as specified in the RSE IBE Key Request message described above). | No | Yes |
| VF-SU-VD11 | During the RSE-Setup Phase and at any further time, the IBE Key Server and the RSE Application Server shall be able to run a mutual authentication procedure (e.g., as specified in the (RSE ←→ IBE Key Server) Authentication interaction described above). | No | Yes |

TABLE 2-continued

RSE Setup Phase Requirements

| Req. # | IBE-parameter-setup Phase Requirements | POC | National |
|---|---|---|---|
| VF-SU-VD12 | During the RSE-Setup Phase and at any further time, the IBE Key Server shall be able to reply to the RSE Application Server's request for a secret key associated to the RSE's identity with a valid secret key that can be used to decrypt messages encrypted according to an identity-based encryption scheme (e.g., as specified in the RSE IBE Key Provision message described above). | No | Yes |
| VF-SU-VD13 | The VDTLS library shall support manual configuration of the IBE system parameters (i.e., n and the master public mpk) and the application secret keys. | Yes | No |
| VF-SU-VD14 | The VDTLS library shall support one identity and secret key pair for each application. | Yes | No |
| VF-SU-VD15 | The VDTLS library shall be able to access and use the secret key from its store to decrypt IBE encrypted data associated with an application provisioned to use VDTLS. | Yes | No |

In the OBE Setup Phase, the OBE Application Client obtains from the IBE Key Server 20 an IBE secret key corresponding to its IBE public identity.

To preserve vehicle privacy, the anonymous 1609.2 certificates used by the vehicles can be used to construct the IBE identities for the OBE. In particular, one choice for the OBE's identity can be the concatenation of the OBE's anonymous 1609.2 certificates with any predetermined combination of the following values:

The UDP Port number of the OBE client application,
The application's public identity, and
A time interval denoting the key's lifetime.

When 1609.2 anonymous certificates are used to construct the IBE identities for the OBE, the OBE Setup Phase must be run every time an OBE receives a new anonymous 1609.2 certificate.

When the 1609.2 anonymous certificates are used for IBE identities for the OBE, the associated IBE secret keys can be distributed to the OBE and subsequently updated in the same way and using the same protocol and process and/or algorithm used to distribute and update the 1609.2 anonymous certificates on the OBEs. Thus, the OBE Setup Phase does not require any new message flows; those message flows required for the download and update of 1609.2 anonymous certificates are sufficient.

The requirements associated with the OBE Setup Phase are described in Table 3. One major difference between OBE Setup Phase and the RSE Setup Phase is that the OBE Setup Phase is run every time an OBE receives a new anonymous certificate. The remaining two requirements refer to.

The creation of IBE identities, which is different from the generation of RSE identities; and The anonymity-preservation property of the OBE identities, which is inherited from the analogue property for anonymous 1609.2 certificates. Specifically, the string used as the IBE identity for an OBE should not help in uniquely identifying the OBE; however, this string does guarantee that it comes from a legitimate OBE (rather than, say, an unauthorized device with radio access). Note that there is typically no need for the IBE identities for the RSEs 14 to support anonymity.

TABLE 3

OBE Setup Phase Requirements

| Req. # | IBE-parameter-setup Phase Requirements | POC | National |
|---|---|---|---|
| VF-SU-VD16 | The IBE key Server and the OBE shall be able to run the OBE Setup Phase together with any transfer of an anonymous certificate to the OBE both during the OBE installation procedure and during anonymous certificate updates such that the IBE secret keys associated with anonymous certificates are also downloaded to the OBE. | No | Yes |
| VF-SU-VD17 | At any time during its lifetime, the OBE VDTLS Library shall be able to generate, acquire, or be provided an identity string containing the OBE's anonymous 1609.2 certificates (if privacy protection is desired) and any pre-determined combination of the following values: the UDP Port number of the OBE server application, the application's public identity, and a time interval denoting the key lifetime. | No | Yes |
| VF-SU-VD18 | At any time during their lifetime, the IBE Key Server, upon receiving an identity string from the OBE, shall be able to verify that the identity string is legitimate in that it refers to one OBE Application Server. | No | Yes |
| VF-SU-VD19 | The VDTLS library shall support manual configuration of five (5) public identities for the OBE (i.e., VDTLS client identity). | Yes | No |
| VF-SU-VD20 | The VDLS library shall randomly pick a client identity from its store for each VDTLS secure session. | Yes | No |

For some applications in one embodiment, e.g., the national VII system, the IBE identity of the OBE may need to be a name that preserves privacy, such as a representation of an anonymous 1609.2 certificate. In this case, the OBE's IBE public identity may be related to its anonymous 1609.2 certificates. The secret keys associated with these identities would be downloaded to the OBE during an anonymous key installation or update. The Certificate Manager on the OBE and on the backend CA can manage the IBE public identities and provide one upon request for a VDTLS secure session. For the POC, a set of five (5) public identities for the OBE, i.e. VDTLS client identity, will be manually configured in the VDTLS library. The VDTLS library will randomly pick an identity from this set for each VDTLS secure session.

Session Establishment Phase

Figure 3:
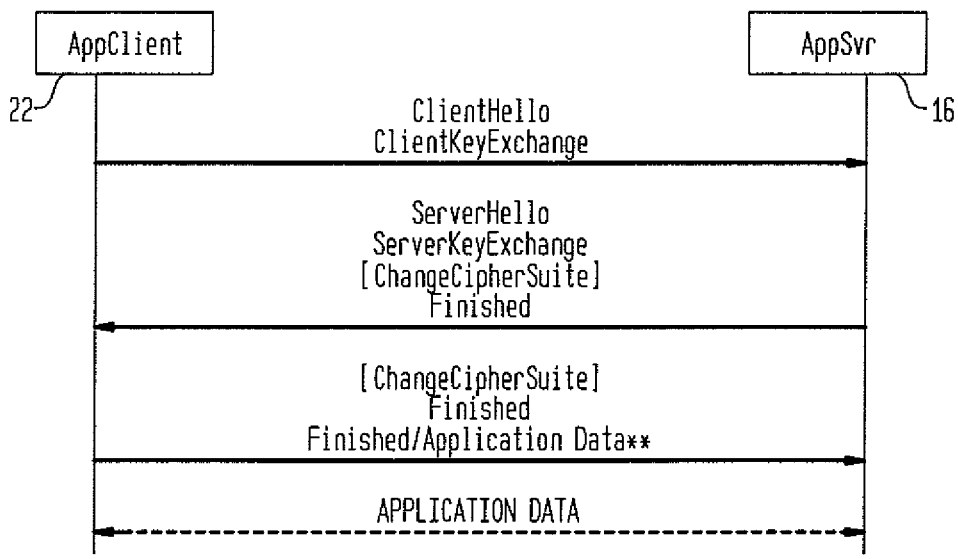
FIG. 3 illustrates a sequence of messages exchanged in new session establishment.

The Session Establishment Phase is run between a VDTLS application client and a VDTLS application server. FIG. 3 illustrates the sequence of VDTLS handshake messages exchanged for new session establishment, and is discussed in more detail below. Typically, the client will be an application, e.g. AppClient 22, on the OBE of the vehicle 12 and the server will be one of several applications 16 on an AppSvr 16 on an RSE 14 or backend server 18. An embodiment in which the OBE interacts with an RSE 14 will be described below. Another embodiment involving a backend server 18 is similar and thus is not described in detail. The outcome of the Session Establishment Phase is that the OBE and the RSE establish a secure session by agreeing on a random secret key that is used for symmetric encryption and data authentication between the two. Symmetric encryption and data authentication are much faster than their asymmetric counterparts.

As discussed above, VDTLS is designed as an extension of the DTLS protocol. UDP is used as the underlying communication protocol during session establishment. A major design principle is to keep the extension as minimal as possible, while striving to satisfy the VDTLS objectives presented above. Furthermore, the VDTLS protocol relies on identity-based encryption and decryption algorithms.

The VDTLS Handshake Protocol for Session Establishment is used to negotiate the security parameters of a secure session. VDTLS uses the DTLS Record Protocol for data transport. VDTLS handshake messages are supplied to the DTLS Record Layer, where they are encapsulated within one or more DTLSPlaintext structures, which are processed and transmitted as specified by the current active session state. As shown in Table 4, VDTLS uses a total of six (6) handshake messages previously defined by DTLS and TLS. Without any changes to the message structure, VDTLS reuses the ClientHello and HelloRequest messages from DTLS and the ServerHello and Finished messages from TLS. VTDLS redefines the structure of the ServerKeyExchange and ClientKeyExchange messages. It does not use the HelloVerifyRequest, Certificate, CertificateRequest, ServerHelloDone, and CertificateVerify messages.

TABLE 4

COMPARISON OF VDTLS, DTLS, AND TLS HANDSHAKE MESSAGES

| Message | VDTLS | DTLS | TLS |
| --- | --- | --- | --- |
| HelloRequest | Yes | Yes | Yes |
| ClientHello | DTLS Version | DTLS Version | Yes |
| ServerHello | Yes | Yes | Yes |
| HelloVerifyRequest | No | Yes | No |
| Certificate | No | Yes | Yes |
| ServerKeyExchange | VDTLS Version | Yes | Yes |

TABLE 4-continued

COMPARISON OF VDTLS, DTLS, AND TLS HANDSHAKE MESSAGES

| Message | VDTLS | DTLS | TLS |
| --- | --- | --- | --- |
| CertificateRequest | No | Yes | Yes |
| ServerHelloDone | No | Yes | Yes |
| CertificateVerify | No | Yes | Yes |
| ClientKeyExchange | VDTLS Version | Yes | Yes |
| Finished | Yes | Yes | Yes |

As shown in FIG. 3, to initiate a new VDTLS secure session, a client 22 sends the ClientHello message to the server 16 using the application's socket. As in DTLS, the ClientHello contains in part the client random structure and the list of cipher suites and compression methods supported by the client 22. For VDTLS, a new set of cipher suites have been defined that use IBE for secure key exchange. As with DTLS, the session ID field is empty for new session establishment.

Immediately following the ClientHello, the client 22 sends the ClientKeyExchange message. As stated above, the structure of the ClientKeyExchange message is unique to VDTLS. ClientKeyExchange contains two cipher components. The first is generated by taking the premaster secret, which is just a random value of specified length created by the client 22, concatenating it with the public identity of the client 22 and symmetrically encrypting the result using a symmetric encryption algorithm. For the VII, 256 bit AES can be used and client identities are randomly selected from client's anonymous certificate set. The second component contains the cipher text of the IBE encrypted symmetric encryption key, for example, an IBE key in accordance with Fukisaki and Okamoto.

As stated above, the structure of the ClientKeyExchange message is unique to VDTLS. ClientKeyExchange contains an encryption c=(r_c*P,E(k_c;pmk|id_obe)), computed in one embodiment using the encryption algorithm BF-ENCRYPT of the IBE scheme and the RSE application server's identity id_rse as the public key of the following two values: the premaster secret pmk, which is a random value of specified length generated by the client, and the public identity id_obe of the client that the server will need to send encrypted messages to the client. Here, the client derives the string id_rse from the server's presence advertising message. The value r_c*P is the shared IBE value that the server will need to calculate the IBE decryption key used by the client. The value k_c is the IBE encryption key generated with the RSE application server's identity id_rse.

In response to the ClientKeyExchange message, the server reviews the list of supported cipher suites and compression methods in the ClientHello and, if acceptable, makes a selection. The server 16 responds to the client 22 with a ServerHello message containing the selected cipher suite and compression method. Unlike TLS and DTLS, the random structure field in the ServerHello message is not used, but is present to maintain consistency with the message format. The server random field in the ServerHello message is ignored by the client. The server provides a session ID, which is a new value for all new sessions.

Following the ServerHello, the server sends the ServerKeyExchange message. As stated above, the structure of the ServerKeyExchange message is unique to VDTLS. Like the ClientKeyExchange message, the ServerKeyExchange message contains two cipher components. The first component or string contains the symmetrically encrypted server random structure, which is used in the calculation of the session master secret. For the VII, 256 bit AES can be used. The second component contains the cipher text of the IBE encrypted AES key that is used to encrypt the server random structure.

In one embodiment, ServerKeyExchange message contains an encryption c=(r_s*P,E(k_s;R)), computed using the encryption algorithm BF-ENCRYPT of the IBE scheme and the OBE application client's identity id_obe as the public key, of the server random structure R. The value r_s*P is the shared IBE value that the client will need to calculate the IBE decryption key used by the server. The value k_s is the IBE encryption key generated with the OBE application client's identity id_obe. The purpose of using IBE to encrypt the server random structure back to the client is to authenticate the client. By using IBE with the public identity of the client, which was passed to the server in the inventive ClientKeyExchange message, the server can encrypt its random structure using a key that can only be determined by the client who possesses the private key corresponding to the provided identity. If client authentication is not required, the server could send its random structure in plaintext.

Even though multiple vehicles 12 actually possess the same public identities due to the shared nature of the certificate pool, the security of each session is not in jeopardy. A vehicle other than the originating vehicle may be able to decrypt the server's random structure if the other vehicle has the same public identity. However, the other vehicle will not be able to decrypt the premaster secret created by the originating vehicle. VDTLS actually protects the server random structure better than DTLS and TLS, where the random structure is transmitted in plaintext.

Before proceeding with the handshake, the server should check the client's public identity, i.e. the client's 1609.2 certificate, against a 1609.2 anonymous certificate revocation list to determine if the certificate is still valid. If no longer valid, the server can terminate the communication, by, for example, ending the exchange with an alert message. Otherwise, the server calculates the session master secret using the premaster secret, the client random structure, and the server random structure as input to the TLS pseudorandom function. The master secret is then hashed into a keyblock using the TLS pseudorandom function and partitioned into MAC secrets and bulk encryption keys. The server follows the ServerKeyExchange message with a ChangeCipherSuite message to inform the client that all subsequent records will be protected under the newly negotiated cipher suite. As with the DTLS and TLS protocols, the ChangeCipherSuite is not considered a handshake message.

The client decrypts the server random structure contained in the ServerKeyExchange message and performs similar calculations to compute the session master secret, MAC secrets, and bulk encryption keys. The client then responds with its own ChangeCipherSpec message to signal the cipher suite change and a Finished message to allow the server to confirm that the client has the proper session master secret. The client also begins to send data following the Finished message within the same frame. The server completes its response by sending a Finished message to verify that the key exchange and authentication processes were successful. The Finished message may contain a keyed hash of the exchanged messages using part of the master secret as a key.

The basic Session Establishment Phase can be prepended by an exchange of two messages, where the client sends a preliminary ClientHello message, the server responds with a HelloVerifyRequest message that contains a cookie, and the follow-up ClientHello message from the client contains the cookie. This technique is also used in DTLS; its purpose is to protect against denial of service attacks with spoofed IP address against the RSE.

The requirements associated with the session establishment in one embodiment are described in Table 5.

TABLE 5

Session Establishment Phase Requirements

| Req. # | Session Establishment Phase Requirements | POC | National |
|---|---|---|---|
| VF-SU-VD21 | The OBE Application Client and the RSE Application Server shall be able to run the Session Establishment Phase at any time the former receives a presence notification from the latter. | Yes | Yes |
| VF-SU-VD22 | At any time during their lifetime, the OBE Application Client and the RSE Application Server shall be able to run the following (mainly security and cryptographic) algorithms: (1) symmetric key-generation, encryption and decryption algorithms (e.g., those associated with AES in CBC mode), (2) symmetric generation and verification algorithms for integrity protection or message authentication (e.g., those associated with AES in CBC mode), (3) keyed cryptographic hash functions as required by DTLS, (4) encryption and decryption algorithms from an identity-based public-key cryptosystem (e.g., those associated with Boneh-Franklin's IBE scheme), (5) a procedure for the secure reading or verification of current time, (6) compression algorithms, as required in DTLS. | Yes | Yes |
| VF-SU-VD23 | The OBE Application Client shall be able to send to the RSE Application Server the client random structure and a list of supported cipher suites and compression methods (e.g., as specified in the ClientHello message) | Yes | Yes |
| VF-SU-VD24 | The OBE Application Client shall be to send an encryption of a premaster secret and the client identity using an identity-based encryption scheme (e.g., as specified in the ClientKeyExchange message). The OBE Application Client shall also send the shared IBE value that the RSE Application Server will need to | Yes | Yes |

TABLE 5-continued

Session Establishment Phase Requirements

| Req. # | Session Establishment Phase Requirements | POC | National |
|---|---|---|---|
| VF-SU-VD25 | calculate the IBE decryption key used by the client (e.g., as specified in the ClientkeyExchange message). The RSE Application Server shall be able to send to the OBE Application Client the selected cipher suite and compression method for the session (e.g., as specified in the ServerHello message). | Yes | Yes |
| VF-SU-VD26 | The RSE Application Server shall be able to send the OBE Application Client an encryption of the server random structure (e.g., as specified in the ServerKeyExchange message). The RSE Application Client shall also send the shared IBE value that the OBE Application Server will need to calculate the IBE decryption key used by the server (e.g., as specified in the ServerKeyExchange message). | Yes | Yes |
| VF-SU-VD27 | The OBE Application Client and the RSE Application Server shall be able to compute a session master secret (e.g., from information provided in the ClientHello, ClientkeyExchange, ServerHello, and ServerKeyExchange messages) and a proof that the exchanged communication messages and authentications were successful (e.g., as specified in the Finished message described above). | Yes | Yes |
| VF-SU-VD28 | The OBE Application Client and the RSE Application Server may be able to use a "cookie-based" mechanism to obtain protection against denial of service attacks from spoofed IP addresses (e.g., as permissible for DTLS). | No | Yes |

Session Renegotiation

Figure 4:
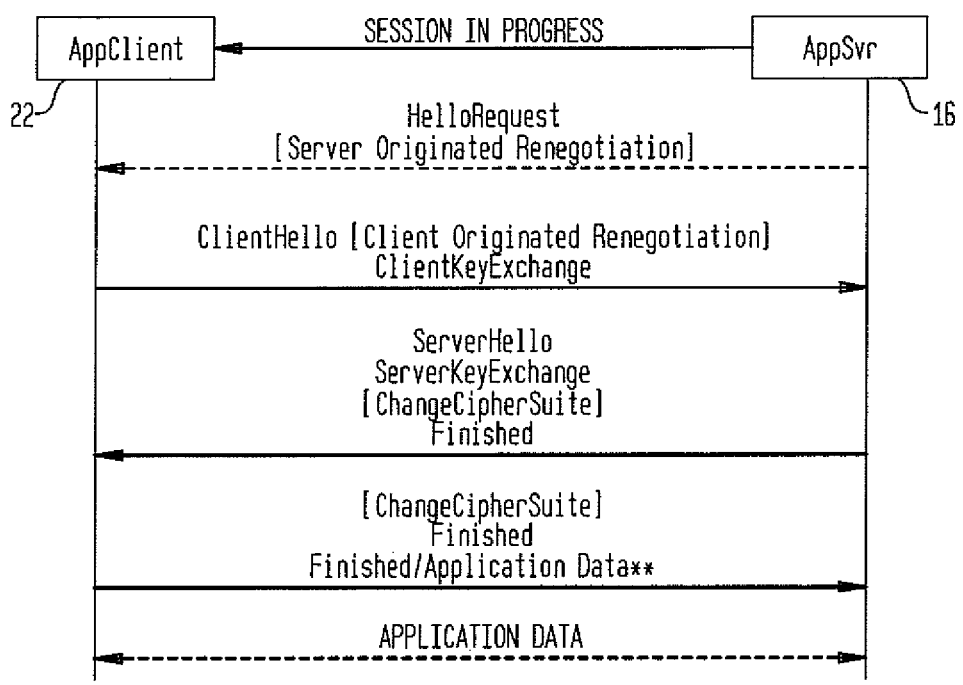
FIG. 4 illustrates a sequence of messages exchanged in session renegotiation.

As with TLS and DTLS, VDTLS supports the renegotiation of session security parameters after a session has been established. Unlike the new session establishment phase described above, renegotiation usually occurs within a non-null cipher context. The message flow for a client-initiated session renegotiation is shown in FIG. 4. Renegotiation can be initiated by either the client 22 or server 16. The client initiates session renegotiation by sending the ClientHello message with an empty session ID. FIG. 4 shows the sequence of Session Renegotiation messages. The sequence is the same as new session establishment shown in FIG. 3. A server 16 may initiate session renegotiation by sending the client 22 a HelloRequest message. The client 22 responds with the ClientHello and the full VDTLS handshake occurs, similar to the session establishment phase discussed above. As with a new session establishment handshake, the client 22 sends an empty field for the session ID in the ClientHello message.

Session Resumption

A session resumption feature allows for fast and light-weight establishment of secure sessions by reusing the security parameters of previously established sessions. This provides a performance benefit because no certificates need to be exchanged and no CPU-intensive asymmetric crypto operations are required to compute new security parameters. For a certain class of VII services, VDTLS allows for session resumption as the efficient means of enabling session mobility across multiple RSE zones.

Figure 5:
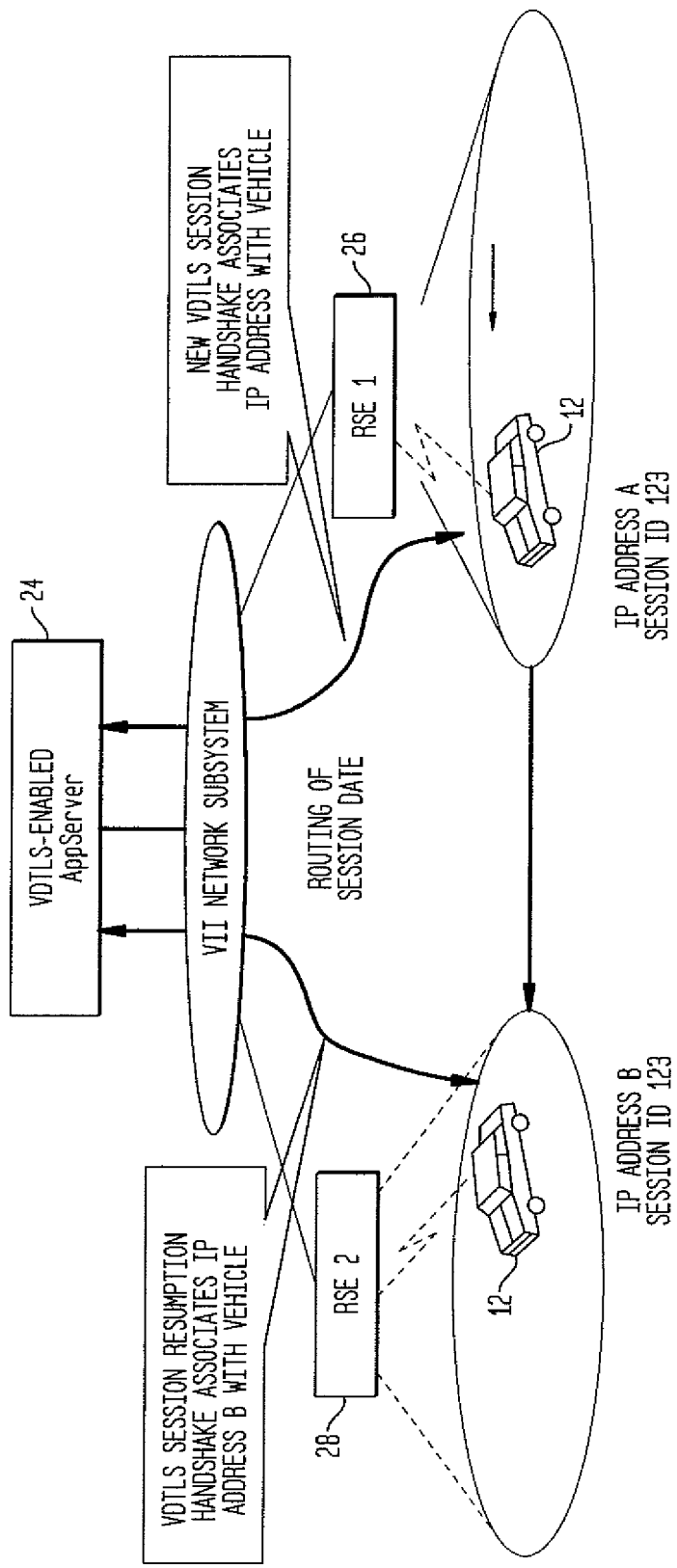
FIG. 5 illustrates session resumption handshake protocol.

To illustrate, consider a situation where a vehicle 12 establishes a secure session with an application server, e.g. AppServer 24, such as an off-board navigation service that is centrally located in the VII network 10 as shown in FIG. 5. The navigation service 24 downloads screen updates and verbal prompts based on the vehicle location. Suppose now that the vehicle 12 leaves the RSE zone in which it has originated the session, e.g. RSE 1 26 and enters a new RSE zone, e.g. RSE 2 28. Upon entering coverage, the vehicle 12 initiates a session resumption handshake using the previous session ID. The navigation server 24 recognizes the session ID and resumes the session. Subsequently, the vehicle 12 and navigation server 24 securely communicate in the new RSE zone 28 while using the same security parameters.

The VDTLS session resumption handshake protocol is similar to that of DTLS. Accordingly, only the design and functional challenges that are unique to session resumption in VDTLS are described. These challenges are mainly due to the short-lived, intermittent network connectivity vehicles experience as they move from one RSE zone to another.

In the VII, for example, a vehicle 12 may leave the RSE zone, e.g. RSE 1 26, and lose network connectivity at any time, and the communicating parties in a secure session may not have a chance to properly close the session. This means that a mechanism should be provided to proactively suspend an ongoing session, cache application data, and re-transmit cached data once the session is resumed. One such mechanism is to force the communicating parties to explicitly acknowledge the receipt of each other's messages. The acknowledgements can be sent by the VDTLS stack for applications that do not do so already. If such an acknowledgement is not received within a timeout period, both the server 24 and client 22 start caching data until the session is resumed.

Unlike the session resumption in TLS or DTLS, the server that participates in the VDTLS session resumption can use a client address in the resumed session that is different from the one used when the original session is established. This is because when the client initiates the session resumption handshake, the vehicle may be in a different RSE zone and thus have a different IP address. Many approaches are possible for the server to learn the new address of the client. For example, the VDTLS session resumption protocol can be extended to include the IP address of the client. Alternatively, the server may retrieve the IP address information from the IP header of handshake packets received from the client. Hence, the VDTLS session resumption requires application state and data management.

Figure 6:
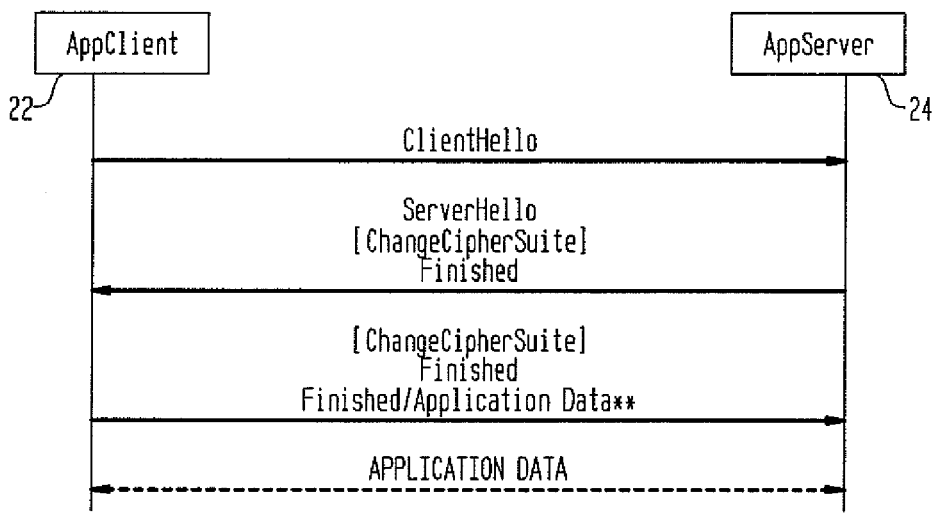
FIG. 6 illustrates a sequence of messages exchanged in session resumption.

The message flow for session resumption is shown in FIG. 6. The client 22 sends a ClientHello message to the server 24 with the ID of the session that it wants to resume. The server 24 responds to the client 22 with the ServerHello message. If the server 24 accepts the client's request, the session ID in the ServerHello message is the same as that sent by the client 22. For a resumed session, the security parameters are recalled and no negotiation of security parameters takes place during the handshake. Consequently, the server 24 follows the ServerHello with a ChangeCipherSuite message and a Finished message. The client 22 responds with the ChangeCipherSuite message and Finished message. The ClientKeyExchange and ServerKeyExchange messages are not exchanged for a session being resumed. Session resumption can be performed for both RSE application servers 16 and back-end application servers 24.

The VDTLS handshake for session resumption can be identical to that used by DTLS and TLS. Table 6 summarizes the VDTLS Handshake Requirements.

or packet loss from the client to the server with the ChangeCipherSpec and Finished messages. If the former, the client does not have enough information to decrypt encrypted messages. Encrypting retransmissions can occur in both the server and client once the ChangeCipherSpec message is sent, requiring the ability to store the previous cipher state and switchback to it upon retransmitting the handshake messages.

In another example, the client and server each store handshake messages using the epoch and message sequence numbers as the index in case there is a need to retransmit a message flight. If the messages had been stored on message sequence number alone, some messages could be overwritten because the ChangeCipherSpec message is not a formal handshake message and does not cause the message sequence number to be incremented. Storing the messages using a combination of epoch and message sequence solves the overwrite problem because the ChangeCipherSpec message had epoch=0, msg_seq=2 and the Finished message used epoch=1, msq_seq=2. The epoch number can be incremented

TABLE 6

VDTLS Handshake Requirements

| Req. # | VDTLS Handshake Requirements |
|---|---|
| VF-SU-VD29 | The client shall send the ClientHello message whenever it wants to initiate a new VDTLS secure session or renegotiate an existing session. |
| VF-SU-VD30 | The client shall send the ClientKeyExchange message immediately following the ClientHello message for new session establishment and session renegotiation. |
| VF-SU-VD31 | The client shall ignore handshake messages received from the server in between the ClientHello and ClientKeyExchange messages for new session establishment and session renegotiation. |
| VF-SU-VD32 | After sending the ClientKeyExchange message, the client shall wait for a ServerHello message. Any other handshake message returned by the server shall be treated by the client as a fatal error. |
| VF-SU-VD33 | Upon receiving the ClientKeyExchange message, the server shall IBE decrypt the AES encryption key and retrieve the premaster secret and client public identity. |
| VF-SU-VD34 | The server shall evaluate the cipher suites and compression methods presented in the ClientHello message, select a cipher suite and compression method to use for the session, and indicate its selection in the ServerHello message, which is sent after receiving the ClientKeyExchange message. |
| VF-SU-VD35 | Following the ServerHello message, the server shall send the ServerKeyExchange message, the ChangeCipherSuite and Finished messages for new session establishment and session renegotiation. |
| VF-SU-VD36 | Upon receiving the ServerKeyExchange message, the client shall IBE decrypt the AES encryption key and retrieve the server random value contained in the ServerKeyExchange message. |
| VF-SU-VD37 | The client shall respond to the server Finished message with a ChangeCipherSuite message followed by its own Finished message. |
| VF-SU-VD38 | To initiate session renegotiation, the server shall send a HelloRequest message. |
| VF-SU-VD39 | The client shall respond to the HelloRequest message with the same sequence of messages as a new session establishment. |
| VF-SU-VD40 | To resume a previous session, the client shall send a ClientHello message with the session ID of the session its wants to resume. |
| VF-SU-VD41 | The server shall respond to a ClientHello message that requests session resumption by sending a ServerHello message with the resumed session ID followed by the ChangeCipherSuite and Finished messages if it agrees to resume the session. |

VDTLS was implemented on top of the open source TLS/DTLS code known as OpenSSL. However, retransmission of handshake messages implemented by the Openssl DTLS code can negatively effect the VDTLS implementation with respect to appropriate responses to dropped packets and/or messages. Some clarification and extensions can be performed to overcome potential retransmission problems. For example, retransmission can occur in plaintext, since the lack of response from the client could indicate either packet loss from the server to the client with the ServerHello, ServerKeyExchange, ChangeCipherSpec, and Finished messages, upon retransmission, that is, every time a ChangeCipherSpec message is sent; however, it may be desirable not to increment it on retransmission enabling use of the same message sequence numbers upon retransmission. It is also worthy to note that the DTLS implementation implements retransmission on the message level, instead of the record level. If it had buffered messages at the record level, it would not have to recreate record headers during retransmission and might have followed the TCP/IP model for TLS, where retransmission takes place at a lower layer. This would have avoided the need for the cipher context switch in DTLS.

The behavior of the client can include a retransmit on receive timeout if the client fails to receive an expected flight of messages. However, on sending its last flight, which includes the ChangeCipherSpec and Finished messages, the client does not expect to receive any response from the server. In this case, the client does not wait to see if the server retransmitted its last flight, indicating that it did not receive the client's final message group. The client immediately went into the connected state and expected to see ContentType of application data. When the server retransmitted with handshake messages, the client would see unexpected messages and either failed or tried to initiate a completely new session. However, upon sending the Finished message, the client can wait to see if the server sends a retransmission. If the client receives retransmitted messages during this period, the client can retransmit its last message flight and again wait for a receive timeout. If, on the other hand, the client times out, then it should enter the connected state. Finally, if the client receives application data during the receive timeout period, it can cancel its receive timer and immediately enter the connected state because the server is already talking in the connected state. The client should retain and process the application data that it received during timeout processing. This functionality is implemented in the VDTLS code on the client side since the client sends the final message without response in new session establishment, session renegotiation, and session resumption scenarios.

In one embodiment, the DTLS code can handle some cases where unexpected handshake messages were received by immediately proceeding to start a new handshake without regard for the state of the other party.

In one embodiment, timeout processing for the final Finished message sent by the client may not be implemented by the Openssl DTLS code. Hence, the client could time out and enters the connected state prior to receiving the server's retransmissions. For example, the server sends its message flight beginning with the ServerHello and ending with its Finished message and then starts receive timeout processing. In response to the server's messages, the client sends its ChangeCipherSpec and Finished messages and starts its own timeout processing. However, suppose the client Finished message is lost in transit and not received by the server. If the network delay is low, the server and client receive timeout processing almost in sync. The server should timeout marginally before the client and resend its ServerHello message group. But if the resend experiences greater network delay, the client would have already switched to the connected state and the session handshake will fail. The client should use a longer receive timeout after sending its Finished message to handle this condition. This applies not only to new session establishment, but also to session renegotiation and resumption. In one inventive embodiment, the client receive timeout can be doubled only for the state immediately after sending the Finished message. The implementation gets the current receive timeout, shifts it one bit to the left, and sets it again. Upon timeout, the receive timeout is restored so that receive timeout processing for session renegotiation would not incur additional delays. In testing, it was found that the client seemed to timeout sooner than the server when using the same receive timeout value and running on the same machine with no apparent network delay, despite the fact that the server should start its timer marginally sooner than the client.

In an alternate embodiment of the invention, the final Finished message is sent by the server instead of the client to provide the client with an absolute signal that the server has switched to data transfer phase. Rather than responding to the client with a combination of ServerHello, ServerKeyExchange, ChangeCipherSpec, and Finished messages, the server can send the ServerHello and ServerKeyExchange and await the client's ChangeCipherSpec, and Finished messages before sending its own ChangeCipherSpec, and Finished messages. This approach is advantageous when the client is first to send data because it gets a positive acknowledgment that the server is in data mode. The former embodiment is advantageous if the server generates the first response after entering data mode.

The record sequence number is supposed to be reset after sending the ChangeCipherSpec message. However, in one implementation of VDTLS, the record sequence number does not get reset after ChangeCipherSpec messages that are retransmitted. This, in part, helps to overcome the replay detection problem discussed below.

Even if the record sequence number does not get reset after retransmitted ChangeCipherSpec messages, the retransmitted messages are subject to rejection by the record replay detection mechanism. For instance, suppose the client ChangeCipherSpec message has record sequence 0x02 with epoch 0x00. The Finished message will have record sequence 0x00 and epoch 0x01, because the sequence is reset after the ChangeCipherSpec message. Suppose that the client ChangeCipherSpec is lost and is never received by the server. When the ChangeCipherSpec message is retransmitted, its record sequence number is 0x01 with epoch 0x00, which is detected as a replay according to the OpenSSL DTLS implementation and DTLS RFC window technique (RFC-4347 4.1.2.5). Incrementing the epoch to distinguish the retransmitted message would cause it to get buffered because the client is still in epoch 0x00.

In one VDTLS implementation, replay detection can cause unnecessary retransmission of handshake messages. For instance, suppose a message in the ServerHello group is lost and the first message begins with record sequence 0x00. The ServerKeyExchange would have record sequence 0x01. The ChangeCipherSpec message would have record sequence 0x02. The Finished message would have record sequence 0x00, because it is reset. Upon retransmission, the ServerHello, ServerKeyExchange, ChangeCipherSpec, and Finished messages would have message sequence numbers 0x01, 0x02, 0x03, 0x04, respectively. The ServerHello and ServerKeyExchange messages would be rejected because of replay detection. Only upon a second retransmission will sequence numbers outside the replay detection window be acquired and be accepted, assuming the record sequence is not reset during retransmission. Accordingly, in one embodiment of VDTLS implementation, the record sequence number is not reset upon sending the ChangeCipherSpec message.

Handshake message queuing may negatively interact with message retransmissions. While messages received with message sequence numbers greater than the expect message sequence number may be buffered, it was observed in the OpenSSL implementation that the processing of buffered messages may undesirably pull retransmitted handshake messages into the data state. For instance, suppose a client sends a ChangeCipherSpec message and Finished message and suppose the server does not receive the ChangeCipherSpec message. The Finished message is received by the server with epoch 0x01. Since the received epoch is greater than the current epoch, the record will be buffered for future processing. When the server receives the retransmitted ChangeCipherSpec message (assuming it is not rejected as a replay) and moves to epoch 0x01, the buffered Finished message will be processed first and the server will enter data mode. However, the client will continue to resend its Finished message. As a result, the server will receive the retransmitted Finished message while in the data mode because it processed the buffered record, causing the session to abort.

One method to address this problem is to add or strengthen requirements for the client and server to ignore all unexpected handshake messages while in data mode. For the server, this means all handshake messages except the ClientHello message, which is needed for client-originated session renegotiation, are ignored. For the client, this means ignoring all handshake messages except the HelloRequest message, which is needed for server-originated session renegotiation. Once renegotiation starts, handshake messages are expected and should be processed accordingly. In addition to addressing the undesirable interaction with the message queuing function, these requirements can be advantageous for robust handshake processing. Specifically, one VDTLS embodiment can implement this filtering as follows.

The server ignores all handshake messages other than the ClientHello when expecting ContentType 23 (application data) records.

The client ignores all handshake messages other than the HelloRequest when expecting ContentType 23 (application data) records.

Additionally, ChangeCipherSpec messages are not processed unless the client and server are in the "receiving Finished message" state.

This situation calls into question the value of queuing. Queuing does not reduce the number of messages that are retransmitted. For example, if a server does not get a response from a client to its ServerHello and ServerKeyExchange, ChangeCipherSpec, and Finished message group, it must retransmit the entire flight because it does not know which, if any, of these messages were not received by the client. The client may have actually received and buffered some of the messages when a message in the middle is lost, or it may have received them all, but its response to the server was lost. Hence, while buffering messages may not save any bandwidth or processing time, it can help with out of order packet reception.

A second solution to remove the interaction between record queuing and replay detection that led to the pushing of handshake messages into the data state is to disable either the queuing or replay detection function. Both methods can work in the OpenSSL code.

Data Transfer Phase

The Data Transfer Phase is entered after the VDTLS session establishment protocol has been completed. During the Data Transfer Phase, an OBE Application client 22 sends data, egg., probe data (telematics information collected by the vehicle), to an RSE Application Server 16. The probe data is encrypted and authenticated using the secret key agreed upon during the session establishment phase or protocol. The Data Transfer Phase can use UDP as the underlying communication protocol and can be based on symmetric encryption, decryption and message authentication algorithms. The Data Transfer Phase is now described in detail.

Secure Data Transfer. Let pm be a probe message that the OBE Application Client 22 intends to send to the RSE Application Server 16. The encryption c of this probe message is computed using any symmetric encryption algorithm) such as AES in CBC mode, and using a 128 or 256-bit symmetric key k1 derived from the master session key shared between the two parties since the end of the session establishment protocol; i.e. c-CBC-AES-encrypt(k1;pm). It also contains a replay and integrity protection pair (tag,ct), where ct is the current time and tag is a value computed using a keyed hash function, such as HMAC, using a symmetric key k2 derived from the master session key; i.e. tag=HMAC(k2;c|ct). Upon receiving the message (c',tag,ct), the RSE Application Server verifies the equality tag'-HMAC(k2;c'|ct') and continues only if this verification is successful. Then the RSE Application Server decrypts the value c' to compute the probe message as pm=CBC_AES-decrypt(k2; c').

VDTLS Architecture

Figure 7:
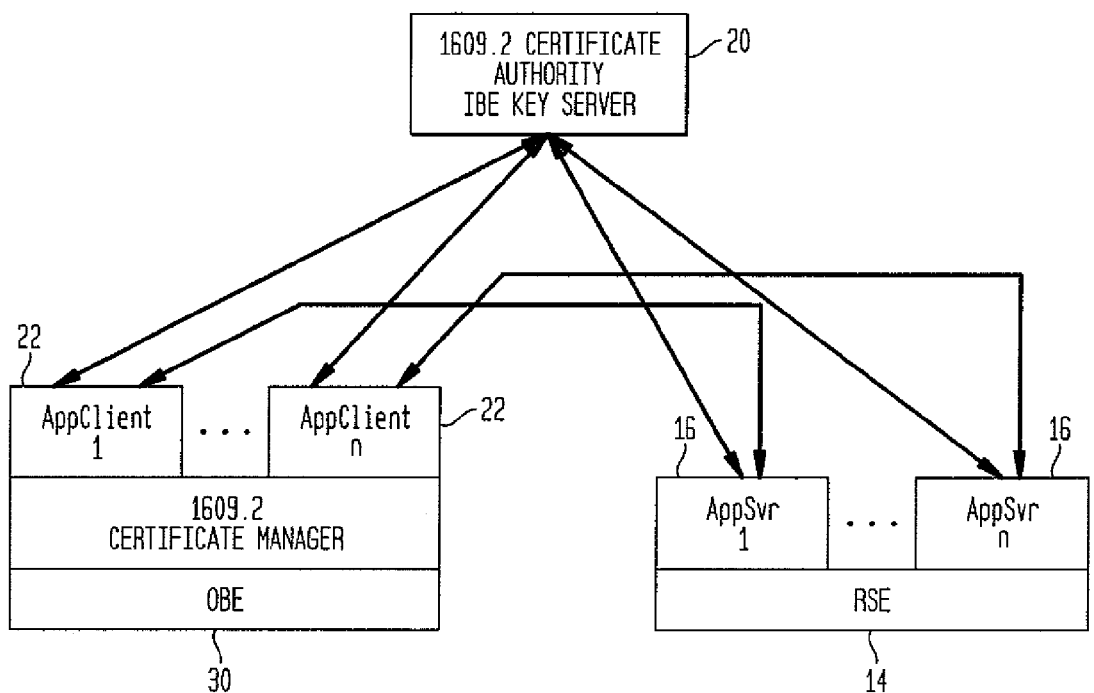
FIG. 7 illustrates an exemplary system architecture.

FIG. 7 shows the VDTLS system architecture. The IBE Key Server 20, which could be implemented as part of the 1609.2 Certificate Authority, provides the following two major functions.

One: The IBE Key Server 20 generates IBE system parameters. These parameter values need to be made known to the VDTLS protocol instances used by the VDTLS applications before the VDTLS protocol can be used. A VDTLS application consists of AppClients 22 and corresponding AppSvrs 16. As shown in FIG. 7, an AppClient 22 is an application component that runs on the OBE 30 and performs the role of a VDTLS client. An AppSvr 16 is an application component that runs on the RSE 14 and plays the role of a VDTLS server. There may be multiple AppClients 22 and AppSvrs 16 at any given time. In one embodiment, AppServer 24 in the VII background infrastructure (not shown) can act as a server 16.

Two: The IBE Key Server 20 generates the private keys corresponding to IBE public identifiers used by VDTLS applications.

Each AppClient 22 on the OBE 30 can have a pool of 1609.2 anonymous certificates. Alternatively, multiple AppClients 22 on the same OBE 30 can share a pool of 1609.2 anonymous certificates. As discussed in more detail below, these certificates are used to anonymously authenticate an AppClient 22 to the corresponding AppSvr 16 in the VDTLS handshake protocol. The management of these certificates is performed by the OBE Certificate Manager that runs on the OBE 30 and 1609.2 Certificate Authority that runs in the VII backend infrastructure.

An exemplary implementation, e.g. the VII POC VDTLS implementation, of the inventive system is presented. VDTLS assumes that the public identity of a server 16, 24 is known to its AppClients 22 prior to negotiating a VDTLS secure session. In V2I communications, the IEEE P1609.3 WAVE Service Advertisement (WSA), which is broadcasted by every RSE 14 to announce the services that are available in its zone, provides information that can be used to form the public identity of each of its applications. For the VII, the public identity of the AppSvr 16 on an RSE 14 can be the combination of the IPv6 address of the RSE and UDP Port Number of the AppSvr, both of which are broadcast in the Provider Service Table (PST) of the WSA. Depending upon the application requirements, the public identity of an OBE 30 may be anonymous or a unique identifier. To obtain anonymous public identities, a hash or serial number of a 1609.2 anonymous certificate may be used.

Table 7 sumnarizes the VDTLS public identity requirements.

TABLE 7

Public Identity Requirements

| Req. # | Public Identity Requirements |
|---|---|
| VF-SU-VD42 | The public identity of the AppSvr on an RSE may be the combination of the IPv6 address of the RSE and UDP Port Number of the AppSvr, both of which are broadcast in the Provider Service Table (PST) of the WSA. |
| VF-SU-VD43 | The public identity of the AppClient may be the serial number or hash of a randomly chosen anonymous certificate designated for the control channel. |
| VF-SU-VD44 | The AppClient shall randomly pick a client pubic identity from the "public_c.ibe" file. |
| VF-SU-VD45 | The public_c_ibe file shall be a text file formatted as follows:<br>N (number of client public identities)\<CR\><br>\<Client Public Identity 1\>\<CR\><br>\<Client Public Identity 2\>\<CR\><br>\<Client Public Identity 3\>\<CR\><br>. . .<br>\<Client Public Identity N\><br>where N is an integer in the range of 1 through 32767 and \<CR\> indicates a carriage return. |
| VF-SU-VD46 | The AppSvr shall read the server public identity from the text file "public_s.ibe", which contains a single entry: \<Server Public Identity\>. |
| VF-SU-VD47 | The AppClient and AppSvr shall support client and server public identities each with character lengths up to 100 characters. |

As discussed above, VDTLS extends the structure of the DTLS ClientKeyExchange message to include new data fields for the IBE key exchange. Table 8 contains the requirements for the creation and use of the ClientKeyExchange message in VDTLS.

TABLE 8

ClientKeyExchange Message Requirements

| Req. # | ClientKeyExchange Message Requirements |
|---|---|
| VF-SU-VD48 | The structure of the ClientKeyExchange message shall be:<br>struct {<br>    select (KeyExchangeAlgorithm) {<br>        case rsa: EncryptedPreMasterSecret;<br>        case diffie_hellman: ClientDiffieHellmanPublic;<br>        case ibe: ClientIBEPublic;<br>    } exchange_keys;<br>} ClientKeyExchange;<br>struct {<br>    opaque aes_encrypted_premaster_secret_client_public_id \<49 . . 2^16-1\>;<br>    IBEEncryptedAESKey client_ibe_encrypted_aes_key;<br>} ClientIBEPublic;<br>struct {<br>    opaque ibe_u \<1 . . 2^16-1\>;<br>    opaque ibe_v \<1 . . 2^16-1\>;<br>    opaque ibe_w \<1 . . 2^16-1\>;<br>} IBEEncryptedAESKey;<br>Where ibe_u represents value U described by Boneh and Franklin formatted as a hexadecimal character string with null terminator of the Miracl library Big data type.<br>Where ibe_v represents value V described by Boneh and Franklin formatted as a hexadecimal character string with null terminator of a Miracl library Big data type.<br>Where ibe_w represents value W described by Boneh and Franklin formatted as a hexadecimal character string with null terminator of a Miracl library Big data type. |
| VF-SU-VD49 | The client shall generate a 48 byte random value for the premaster secret for each new and renegotiated VDTLS session. The premaster secret shall be defined as:<br>opaque PreMasterSecret[48]; |
| VF-SU-VD50 | The client shall randomly choose a public identity to use for each new VDTLS session. The client public identity shall be defined as:<br>opaque ClientPublicID[2]; |
| VF-SU-VD51 | The client shall concatenate the premaster secret and chosen client public identity as follows:<br>PreMasterSecretClientPublicID premaster_secret_client_public_id;<br>struct {<br>    PreMasterSecret premaster_secret; |

TABLE 8-continued

ClientKeyExchange Message Requirements

| Req. # | ClientKeyExchange Message Requirements |
|---|---|
| | ClientPubicID client_public_id;<br>} PreMasterSecretClientPublicID;<br>The client_public_id can vary in length from <1 .. 2^16–49> bytes but is not preceded by a length value. The client_public_id shall include a null terminator. |
| VF-SU-VD52 | The client shall generate a 32 byte random value as the AES encryption key for each new and renegotiated VDTLS session. The AES encryption key shall be defined as:<br>opaque client_aes_encryption_key[32]; |
| VF-SU-VD53 | The client shall generate the aes_encrypted_premaster_secret_client_public_id by symmetrically encrypting the premaster_secret_client_public_id using a 256 bit version of AES and the client_aes_encryption_key.<br>aes_encrypted_premaster_secret_client_public_id = $E_{AES256}$\{premaster_secret_client_public_id\} = $E_{AES256}$\{premaster secret \| client public identity (w/terminator)\} |
| VF-SU-VD54 | The client shall generate a new IBE random value (cr) for each new and renegotiated VDTLS session. IBE random value (cr) shall be defined as:<br>opaque cr[32];<br>where cr = $H_3$(σ, M) and σ is a random value chosen by the client and M is the client_aes_encryption_key |
| VF-SU-VD55 | The client shall IBE encrypt the client_aes_encryption_key using the server public identity, the client IBE random value (cr) and the IBE system parameters.<br>client_ibe_encrypted_aes_key = $E_{IBE}$\{client_aes_encryption_key\} |

As discussed above, VDTLS also extends the structure of the DTLS ServerKeyExchange message to include new data fields for the IBE key exchange. Table 9 contains the requirements for the creation and use of the ServerKeyExchange message in VDTLS.

TABLE 9

ServerKeyExchange Message Requirements

| Req. # | ServerKeyExchange Message Requirements |
|---|---|
| VF-SU-VD56 | The structure of the ServerKeyExchange message shall be:<br>struct {<br>  select (KeyExchangeAlgorithm) {<br>    case rsa:<br>      ServerRSAParams params;<br>      Signature signed_params;<br>    case diffie_hellman:<br>      ServerDHParams params<br>      Signature signed_params;<br>    case ibe: ServerIBEPublic;<br>  };<br>} ServerKeyExchange;<br>struct {<br>  opaque aes_encrypted_server_random <0 .. 2^16–1>;<br>  IBEEncryptedAESKey server_ibe_encrypted_aes_key;<br>} ServerIBEPublic;<br>struct {<br>  opaque ibe_u <1 .. 2^16–1>;<br>  opaque ibe_v <1 .. 2^16–1>;<br>  opaque ibe_w <1 .. 2^16–1>;<br>} IBEEncryptedAESkey;<br>Where ibe_u represents value U described by Boneh and Franklin formatted as a hexadecimal character string with null terminator of the Miracl library Big data type.<br>Where ibe_v represents value V described by Boneh and Franklin formatted as a hexadecimal character string with null terminator of a Miracl library Big data type.<br>Where ibe_w represents value W described by Boneh and Franklin formatted as a hexadecimal character string with null terminator of a Miracl library Big data type. |
| VF-SU-VD57 | The server shall generate a server random structure for each new and renegotiated VDTLS session. The server random structure shall be defined as:<br>Random server_random;<br>  struct { |

TABLE 9-continued

ServerKeyExchange Message Requirements

| Req. # | ServerKeyExchange Message Requirements |
|---|---|
| | unint32 gmt_unix_time;<br>opaque random_bytes[28];<br>} Random; |
| VF-SU-VD58 | The server shall generate a 32 byte random value as the AES encryption key for each new and renegotiated VDTLS session. The AES encryption key shall be defined as:<br>opaque server_aes_encryption_key[32]; |
| VF-SU-VD59 | The server shall generate the aes_encrypted_server_random by symmetrically encrypting the server_random using a 256 bit version of AES and the server_aes_encryption_key.<br>aes_encrypted_server_random = $E_{AES256}\{server\_aes\_encryption\_key\}$ |
| VF-SU-VD60 | The server shall generate a new IBE random value (sr) for each new and renegotiated VDTLS session. IBE random value (sr) shall be defined as:<br>opaque sr[32];<br>where sr = $H_3$ (σ,M) and σ is a random value chosen by the server and M is the server_aes_encryption_key |
| VF-SU-VD61 | The server shall IBE encrypt the server_aes_encryption_key using the client public identity received in the ClientKeyExchange message, the server IBE random value (sr) and the IBE system parameters.<br>server_be_encrypted_aes_key = $E_{IBE}\{server\_aes\_encryption\_key\}$ |

Various aspects of the present disclosure may be embodied as a program, software, or computer instructions embodied in a computer or machine usable or readable medium, which causes the computer or machine to perform the steps of the method when executed on the computer, processor, and/or machine. Likewise, a recorded program for causing a computer to execute a process tangibly embodied on a computer-readable storage medium can embody various aspects of the present disclosure.

The security system can include a computer system. The terms "computer system" and "computer network" as may be used in the present application may include a variety of combinations of fixed and/or portable computer hardware, software, peripherals, and storage devices. The computer system may include a plurality of individual components that are networked or otherwise linked to perform collaboratively, or may include one or more stand-alone components. The hardware and software components of the computer system of the present application may include and may be included within fixed and portable devices such as desktop, laptop, embedded system and/or server. A module may be a component of a device, software, program, or system that implements some "functionality", which can be embodied as software, hardware, firmware, electronic circuitry, or etc.

The embodiments described above are illustrative examples and it should not be construed that the present invention is limited to these particular embodiments. Thus, various changes and modifications may be effected by one skilled in the art without departing from the spirit or scope of the invention as defined in the appended claims.

What is claimed is:

1. A system for providing security for UDP communications in a Vehicle Integration Infrastructure (VII) network, the system comprising:
a fixed server configured to execute a plurality of first applications; and
mobile on-board equipment located in a vehicle, the on-board equipment configured to execute a plurality of second applications;
wherein the server and on-board equipment are configured to establish a secure session by agreeing on a random secret key that is used for symmetric encryption and data authentication between the server and the on-board equipment;
wherein the on-board equipment is configured to send to the server:
compression methods supported by the on-board equipment and a list of cipher suites that use Identity-based Encryption (IBE) for secure key exchange;
a symmetrically encrypted first cipher component generated by concatenating a random value with a public identity of the on-board equipment, and symmetrically encrypting the first cipher component using a symmetric encryption algorithm; and
a second cipher component comprising a cipher text of an IBE-encrypted symmetric encryption key;
wherein the server is configured to:
select a compression method and cipher suite from the compression methods supported by the on-board equipment and the list of cipher suites;
notify the on-board equipment of the selected compression method and cipher suite together with a session identifier (ID);
send to the on-board equipment, a third cipher component comprising a symmetrically encrypted server random structure, and a fourth cipher component comprising a cipher text of an IBE-encrypted Advanced Encryption Standard (AES) key utilized to encrypt the server random structure;
determine that the on-board equipment's public identity is currently valid;
calculate a session master secret, Message Authentication code (MAC) secrets, and bulk encryption keys utilizing the first and second cipher components and the server random structure as inputs to a pseudorandom function; and
notify the on-board equipment that all subsequent records will be protected under the selected cipher suite;
wherein the on-board equipment is further configured to:
decrypt the server random structure and calculate the session master secret, MAC secrets, and bulk encryption keys;

respond to the server acknowledging the selected cipher suite; and begin transmitting data under the selected cipher suite.

2. A method in a Vehicle Integration Infrastructure (VII) network for establishing a secure session for UDP communications between a fixed server and mobile on-board equipment located in a vehicle, the method comprising the steps of:

sending from the on-board equipment to the server:

compression methods supported by the on-board equipment and a list of cipher suites that use Identity-based Encryption (IBE) for secure key exchange;

a symmetrically encrypted first cipher component generated by concatenating a random value with a public identity of the on-board equipment, and symmetrically encrypting the first cipher component using a symmetric encryption algorithm; and a second cipher component comprising a cipher text of an IBE-encrypted symmetric encryption key;

selecting by the server, a compression method and cipher suite from the compression methods supported by the on-board equipment and the list of cipher suites;

sending a notification from the server to the on-board equipment of the selected compression method and cipher suite together with a session identifier (ID);

sending from the server to the on-board equipment, a third cipher component comprising a symmetrically encrypted server random structure, and a fourth cipher component comprising a cipher text of an IBE-encrypted Advanced Encryption Standard (AES) key utilized to encrypt the server random structure;

determining by the server that the on-board equipment's public identity is currently valid;

calculating by the server, a session master secret, Message Authentication code (MAC) secrets, and bulk encryption keys utilizing the first and second cipher components and the server random structure as inputs to a pseudorandom function; and sending a notification from the server to the on-board equipment that all subsequent records will be protected under the selected cipher suite;

decrypting the server random structure by the on-board equipment and calculating the session master secret, MAC secrets, and bulk encryption keys;

sending a message from the on-board equipment to the server acknowledging the selected cipher suite; and transmitting data under the selected cipher suite from the on-board equipment to the server.

3. An arrangement comprising two or more non-transitory computer-readable media having programs stored thereon for causing a server in a Vehicle Integration Infrastructure (VII) network and on-board computing equipment located in a vehicle to execute a method comprising:

sending from the on-board computing equipment to the server:

compression methods supported by the on-board computing equipment and a list of cipher suites that use Identity-based Encryption (IBE) for secure key exchange;

a symmetrically encrypted first cipher component generated by concatenating a random value with a public identity of the on-board computing equipment, and symmetrically encrypting the first cipher component using a symmetric encryption algorithm; and a second cipher component comprising a cipher text of an IBE-encrypted symmetric encryption key;

selecting by the server, a compression method and cipher suite from the compression methods supported by the on-board computing equipment and the list of cipher suites;

sending a notification from the server to the on-board computing equipment of the selected compression method and cipher suite together with a session identifier (ID);

sending from the server to the on-board computing equipment, a third cipher component comprising a symmetrically encrypted server random structure, and a fourth cipher component comprising a cipher text of an IBE-encrypted Advanced Encryption Standard (AES) key utilized to encrypt the server random structure;

determining by the server that the on-board computing equipment's public identity is currently valid;

calculating by the server, a session master secret, Message Authentication code (MAC) secrets, and bulk encryption keys utilizing the first and second cipher components and the server random structure as inputs to a pseudorandom function; and sending a notification from the server to the on-board computing equipment that all subsequent records will be protected under the selected cipher suite;

decrypting the server random structure by the on-board computing equipment and calculating the session master secret, MAC secrets, and bulk encryption keys;

sending a message from the on-board computing equipment to the server acknowledging the selected cipher suite; and transmitting data under the selected cipher suite from the on-board computing equipment to the server.

* * * * *